US009370014B2

(12) United States Patent
Tanno et al.

(10) Patent No.: US 9,370,014 B2
(45) Date of Patent: Jun. 14, 2016

(54) RADIO COMMUNICATION APPARATUS AND METHOD

(71) Applicant: NTT DOCOMO, INC., Tokyo (JP)

(72) Inventors: Motohiro Tanno, Yokohama (JP);
Hiroyuki Atarashi, Yokohama (JP);
Kenichi Higuchi, Yokohama (JP);
Mamoru Sawahashi, Yokohama (JP)

(73) Assignee: NTT DOCOMO, INC., Tokyo (JP)

( * ) Notice: Subject to any disclaimer, the term of this patent is extended or adjusted under 35 U.S.C. 154(b) by 269 days.

(21) Appl. No.: 13/890,886

(22) Filed: May 9, 2013

(65) Prior Publication Data

US 2013/0329655 A1 Dec. 12, 2013

Related U.S. Application Data

(63) Continuation of application No. 11/909,800, filed as application No. PCT/JP2006/305497 on Mar. 20, 2006.

(30) Foreign Application Priority Data

Apr. 1, 2005 (JP) .................................. 2005-106907

(51) Int. Cl.
*H04B 17/00* (2015.01)
*H04W 72/08* (2009.01)
*H04L 12/28* (2006.01)
*H04W 72/04* (2009.01)

(52) U.S. Cl.
CPC ......... *H04W 72/085* (2013.01); *H04L 12/2854* (2013.01); *H04W 72/0413* (2013.01)

(58) Field of Classification Search
None
See application file for complete search history.

(56) References Cited

U.S. PATENT DOCUMENTS

| 2003/0043732 | A1 | 3/2003 | Walton et al. |
| 2004/0001429 | A1 | 1/2004 | Ma et al. |
| 2004/0022213 | A1 | 2/2004 | Choi et al. |
| 2005/0041622 | A1 | 2/2005 | Dubuc et al. |
| 2005/0068884 | A1 | 3/2005 | Yoon et al. |
| 2005/0220002 | A1 | 10/2005 | Li et al. |

(Continued)

FOREIGN PATENT DOCUMENTS

| EP | 1578043 A1 | 9/2005 |
| EP | 1 635 495 A1 | 3/2006 |

(Continued)

OTHER PUBLICATIONS

Office Action in counterpart Indian Patent Application No. 3632/KOLNP/2007 dated Jan. 23, 2014 (3 pages).

(Continued)

*Primary Examiner* — Zhiyu Lu
(74) *Attorney, Agent, or Firm* — Osha Liang LLP

(57) ABSTRACT

In a radio communication system, a downlink frequency band includes a plurality of frequency blocks including one or more carrier frequencies, and one or more frequency blocks are used for data transmission to a single user. A radio communication apparatus for use in the communication system has an evaluation unit evaluating the quality of a received signal for each frequency block and storing plurality of stored quality evaluations of the received signal, a comparison unit comparing the plural quality evaluations of the received signal, and a transmission unit transmitting a predetermined number of the quality evaluations of the received signal over an uplink control channel.

9 Claims, 12 Drawing Sheets

(56) References Cited

U.S. PATENT DOCUMENTS

| | | |
|---|---|---|
| 2006/0008020 A1 | 1/2006 | Blankenship et al. |
| 2006/0089102 A1 | 4/2006 | Nishio et al. |
| 2006/0153061 A1 | 7/2006 | Nishio |
| 2006/0198293 A1 | 9/2006 | Nishio et al. |
| 2007/0054689 A1 | 3/2007 | Baker et al. |
| 2009/0175178 A1 | 7/2009 | Yoon et al. |

FOREIGN PATENT DOCUMENTS

| | | |
|---|---|---|
| JP | 2004-135305 A | 4/2004 |
| JP | 3512783 P | 4/2004 |
| JP | 2004-208234 A | 7/2004 |
| JP | 2004-215104 A | 7/2004 |
| JP | 2004-537875 | 12/2004 |
| JP | 2005-244958 | 9/2005 |
| JP | 2006-115386 A | 4/2006 |
| JP | 2006-135555 A | 5/2006 |
| KR | 1020050005993 A | 1/2005 |
| TW | 200501787 | 1/2005 |
| TW | 200501787 | 3/2007 |
| WO | 02/49306 A2 | 6/2002 |
| WO | 2004062148 A1 | 7/2004 |
| WO | 2004/077712 A1 | 9/2004 |
| WO | 2004/095851 A2 | 11/2004 |
| WO | 2004/098072 A2 | 11/2004 |
| WO | 2004/102828 A1 | 11/2004 |
| WO | 2005/006622 A1 | 1/2005 |
| WO | 2005015801 A2 | 2/2005 |

OTHER PUBLICATIONS

Office Action for Taiwanese Application No. 095110070 mailed Jun. 3, 2010, with English translation thereof (9 pages).

Supplementary European Search Report for European Application No. 06 72 9465 mailed on Feb. 14, 2012 (8 pages).

Office Action for Japanese Application No. 2009-180659 mailed Jun. 21, 2011, with English translation thereof (4 pages).

Patent Abstract for Japanese Publication No. 2004-135305 published Apr. 30, 2004 (1 page).

Patent Abstract for Japanese Publication No. 2004-215104 published Jul. 29, 2004 (1 page).

T. Ue, et al., "Symbol Rate and Modulation Level-Controlled Adaptive Modulation/TDMA/TDD System for High-Bit-Rate Wireless Data Transmission," IEEE Trans. VT, pp. 1134-1147, vol. 47, No. 4, Nov. 1998 (14 pages).

S. Lin, et al., "Automatic-Repeat-Request Error-Control Schemes," IEEE Communication Magazine, vol. 12, No. 12, pp. 5-17, Dec. 1984 (13 pages).

Office Action for Chinese Application No. 200680014466.0 mailed Apr. 13, 2010, with English translation thereof (10 pages).

Office Action for Japanese Application No. 2009-068796 dated Jun. 2, 2009, with English translation thereof (5 pages).

Patent Abstract for Japanese Publication No. 2004-134898 dated Apr. 30, 2004 (1 page).

Office Action for Japanese Application No. 2005-106907 mailed Nov. 10, 2009, with English translation thereof (5 pages).

International Search Report issued for International Application No. PCT/JP2006/305497 dated Jul. 4, 2006, with English translation thereof (5 pages).

Examiner's Answer issued in related U.S. Appl. No. 11/909,800, mailed Jan. 15, 2015 (12 pages).

Office Action issued in corresponding Chinese Application No. 201310167984.8 dated Aug. 13, 2015, and English translation thereof (19 pages).

Office Action issued in corresponding Chinese Application No. 201110044240.8 dated Nov. 6, 2015, and English ranslation thereof (18 pages).

Office Action issued in corresponding Chinese Application No. 201110044240.8, mailed on Mar. 30, 2016 (12 pages).

Office Action issued in corresponding Chinese Application No. 201310167984.8 dated Feb. 29, 2016, and English ranslation thereof (16 pages).

| DATA MODULATION SCHEMES | CHANNEL CODING RATE | RELATIVE INFORMATION BIT RATE |
|---|---|---|
| QPSK | 1/3 | 1 |
| QPSK | 1/2 | 1.5 |
| QPSK | 2/3 | 2 |
| QPSK | 6/7 | 2.57 |
| 16QAM | 1/2 | 3 |
| 16QAM | 2/3 | 4 |
| 16QAM | 3/4 | 4.5 |
| 16QAM | 5/6 | 5 |
| 16QAM | 6/7 | 5.24 |
| 16QAM | 8/9 | 5.33 |

FIG.8
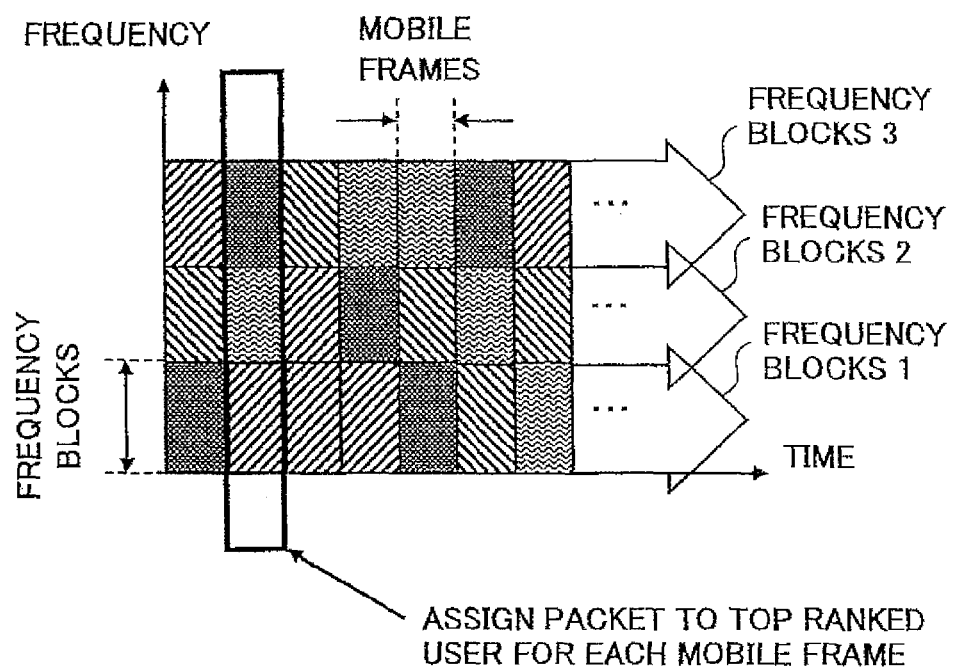
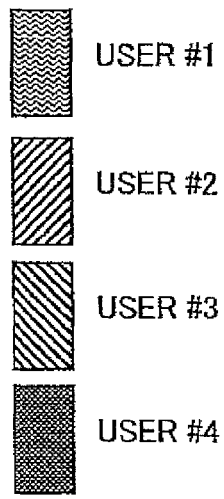

- REPORT AVERAGE RECEIVING CHANNEL STATE INFORMATION OF ALL SUBCARRIERS AND DIFFERENCES BETWEEN THE AVERAGE AND CARRIERS AS CONTROL INFORMATION

[Mbps]

|  | 1ST EMBODIMENT | 2ND EMBODIMENT | 3RD EMBODIMENT | 2ND AND 3RD EMBODIMENTS |
|---|---|---|---|---|
| Ka=20 | 1.61 | 0.81 | 0.77 | 0.45 |
| Ka=40 | 3.22 | 1.62 | 1.53 | 0.89 |

RADIO COMMUNICATION APPARATUS AND METHOD

CROSS-REFERENCE TO RELATED APPLICATIONS

The present application is a continuation application of and, thereby, claims benefit under 35 U.S.C. §120 to U.S. patent application Ser. No. 11/909,800 filed on Sep. 26, 2007, titled, "RADIO COMMUNICATION APPARATUS AND METHOD," which is a national stage application of PCT Application No. PCT/JP2006/305497, filed on Mar. 20, 2006, which claims priority to Japanese Patent Application No. 2005-106907 filed on Apr. 1, 2005. The contents of the priority applications are incorporated by reference in their entirety.

TECHNICAL FIELD

The present invention relates to the technical field of radio communication, and more specifically relates to a radio communication apparatus and a method for use in a communication system where packet scheduling is carried out on the downlink.

BACKGROUND ART

In the third generation communication scheme, typically such as IMT-2000 (International Mobile Telecommunications-2000), in particular, a faster and higher-capacity downlink is sought, and for example, the information transmission rate of higher than or equal to 2 Mbps is achieved by using the frequency band of 5 MHz. IMT-2000 adopts the single carrier Wideband-Code Division Multiple Access (W-CDMA) scheme. Alternately, some scheme called High Speed Downlink Packet Access (HSDPA) may be employed. In HSDPA, the Adaptive Modulation and channel Coding (AMC) scheme, MAC layer packet Automatic Repeat Request (ARQ) scheme, fast packet scheduling and others are-employed to achieve higher transmission rates and higher quality. For example, AMC is described in non-patent document 1. ARQ is described in non-patent document 2.

FIG. 1 is a schematic view for explaining the AMC scheme. Assuming that transmission power from a base station is fixed, in general, a terminal 11 closer to a base station 10 can receive signals with greater power than a terminal 12 far from the base station 10. Hence, since it is estimated that the terminal 11 has a better channel state, a greater modulation level and a higher coding rate are adopted. On the other hand, the terminal 12 receives signals with less power than the terminal 11. Thus, since it is estimated that the terminal 12 does not have a good channel state, a smaller modulation level and a lower coding rate are adopted.

FIG. 2 shows an exemplary combination of different modulation schemes (modulation level) and different channel coding rates. In the illustrated table, the rightmost column represents relative bit rates in the case of the bit rate being "1" under the modulation scheme M of "QPSK" and the channel coding rate R of "1/3". For example, if M="QPSK" and R="1/2", the bit rate of ×1.5 is obtained. In general, there is tendency that the higher bit rate is, the less reliability is. More specifically, combinations between different modulation schemes and the coding rates and different amounts indicative of channel states are predefined in a listing table, and the modulation schemes and others are changed depending on the channel state if needed. The amount indicative of the channel state is managed as Channel Quality Indicator (CQI), which is typically SIR (Signal to Interference power Ratio) and SINR of a received signal.

FIG. 3 is a schematic view for explaining the ARQ (more accurately, hybrid ARQ). The hybrid ARQ scheme is a technique derived from a combination of the ARQ scheme of requesting retransmission of packets depending on results of error detection (CRC: Cyclic Redundancy Check) and some error correction coding scheme (also referred to as channel coding) for error correction. As illustrated, a CRC bit is added to a transmission data sequence S1), and the resulting signal is sent after completion of error correction encoding (S2). In response to receipt of the signal, error correction decoding (also referred to as "channel decoding") is carried out (S3), and error detection is carried out (S4). If some error is detected, retransmission of the packet is requested to the transmitting side (S5). As illustrated in FIG. 4, there are several methods for such retransmission.

In an exemplary method illustrated in FIG. 4A, packet P1 is sent from the transmitting side to the receiving side. If some error is detected at the receiving side, the packet P1 is discarded and then the retransmission is requested. In response to the retransmission request, the transmitting side resends the same packet (represented as "P2") as the packet P1.

In an exemplary method illustrated in FIG. 4B, packet P1 is sent from the transmitting side to the receiving side. If some error is detected at the receiving side, the receiving side keeps the packet P1 without discarding it. In response to the retransmission request, the transmitting side resends the same packet (represented as "P2") as the packet P1. Then, the receiving side generates packet P3 by combining the previously received packet with the currently received packet. Since the packet P3 corresponds to one transmitted with double the power of packet P1, the demodulation accuracy is improved.

Also in an exemplary method illustrated in FIG. 4C, packet P1 is sent from the transmitting side to the receiving side. If some error is detected at the receiving side, the receiving side keeps the packet P1 without discarding it. In response to the retransmission request, the transmitting side sends redundancy data derived by performing certain operations on the packet P1 as packet P2. For example, assume that a sequence of packets such as "P1, P1', P1", . . . " has been derived by encoding the packet P1. The derived sequence may differ depending on adopted coding algorithms. In the illustrated example, in response to receipt of a retransmission request, the transmitting side sends P1' as packet P2. The receiving side generates packet P3 by combining the previously received packet with the currently received packet. Since the packet P3 has increased redundancy, the demodulation accuracy will be improved. For example, assuming that the coding rate of the packet P1 is equal to "1/2", the coding rate of the packet P3 becomes equal to "1/4", thereby resulting in improved reliability. Note that the receiving side must already know some information as to what coding algorithm is adopted, what redundancy data are sent (also referred to as "puncture pattern"), and others.

Fast packet scheduling scheme is a technique intended to improve frequency utilization efficiency in downlink. In a mobile communication environment, the channel state between a mobile station (user) and a base station varies over time as illustrated in FIG. 5. In this case, even though transmission of a large amount of data to a user with poor channel state is attempted, it is hard to improve the throughput. On the other hand, the higher throughput would be achieved for a user with a good channel state. From such a viewpoint, it is possible to improve the frequency utilization efficiency by determining whether the channel state is good for each user and assigning a shared data packet in favor of the user with the better channel state.

FIG. 5 is a schematic diagram for explaining the fast packet scheduling scheme. As illustrated, a shared data packet is assigned to a user with the better channel state (a user associated with greater SINR) in each time slot.

Non-patent document 1: T. Ue, S. Aampei, N. Morinaga and K. Hamaguchi, "Symbol Rate and Modulation Level-Controlled Adaptive Modulation/TDMA/TDD System for High-Bit-Rate Wireless Data Transmission", IEEE Trans. VT, pp. 1134-1147, vol. 47, No. 4, November 1998

Non-patent document 2: S. Lin, Costello, Jr. and M. Miller, "Automatic-Repeat-Request Error Control Schemes", IEEE Communication Magazine, vol. 12, No. 12, pp. 5-17, December 1984

DISCLOSURE OF INVENTION

Object to be Solved by the Invention

In this technical field, there is a strong need of improved speed and capacity of radio transmission, and in a future communication system, further improved efficiency of radio transmission and further utilization efficiency of a frequency band are desired.

One object of the present invention is to provide a radio communication apparatus and a method for use in a communication system where a shared data packet is assigned for a user with a better channel state by priority for further improvement of frequency utilization efficiency.

Means for Solving the Object

In an embodiment of the present invention, there is provided a radio communication apparatus for use in a communication system where a downlink frequency band includes a plurality of frequency blocks including one or more carrier frequencies and one or more frequency blocks are used for data transmission to a single user. The apparatus includes an evaluation unit evaluating quality of a received signal for each frequency block and storing a plurality of quality evaluations of the received signal, a comparison unit comparing the plurality of quality evaluations of the received signal, and a transmission unit transmitting a predetermined number of quality evaluations of the received signal over an uplink control channel.

Advantage of the Invention

According to the embodiment of the present invention, higher frequency utilization efficiency is achieved in a communication system where a shared data packet is assigned for a user with a better channel state by priority.

BRIEF DESCRIPTION OF DRAWINGS

FIG. 8 is a diagram illustrating an exemplary method of assigning frequency blocks.

LIST OF REFERENCE SYMBOLS

Figure 1:
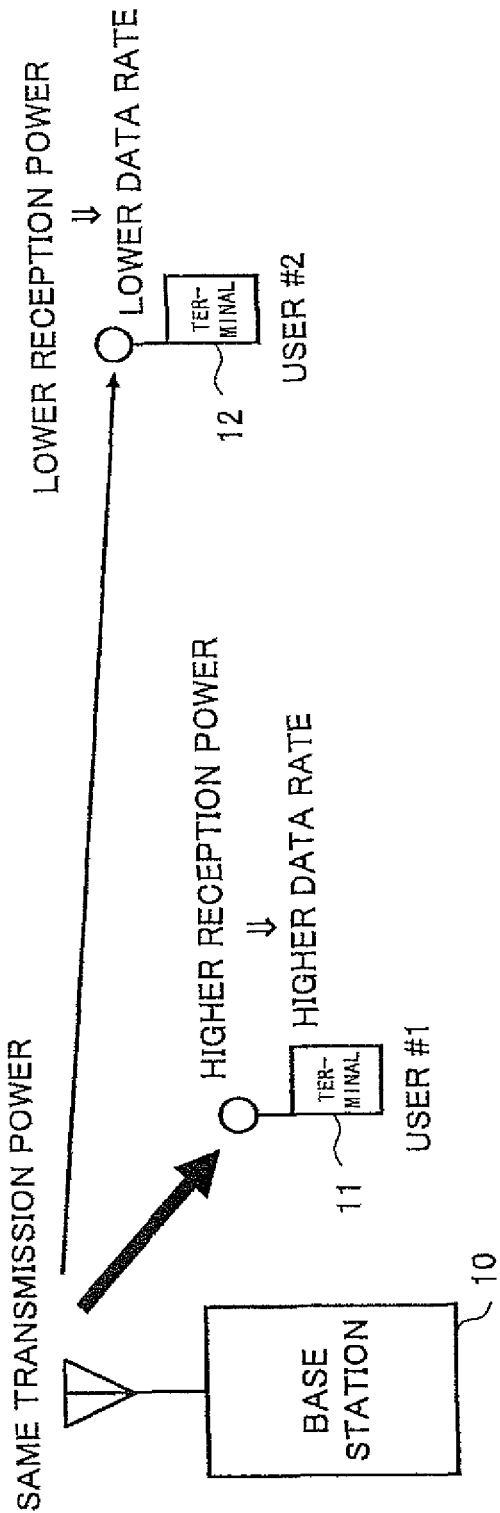
FIG. 1 is a schematic view for explaining the AMC scheme.
Figure 2:
FIG. 2 is a diagram illustrating an exemplary combination between modulation schemes and channel coding rates.
Figure 3:
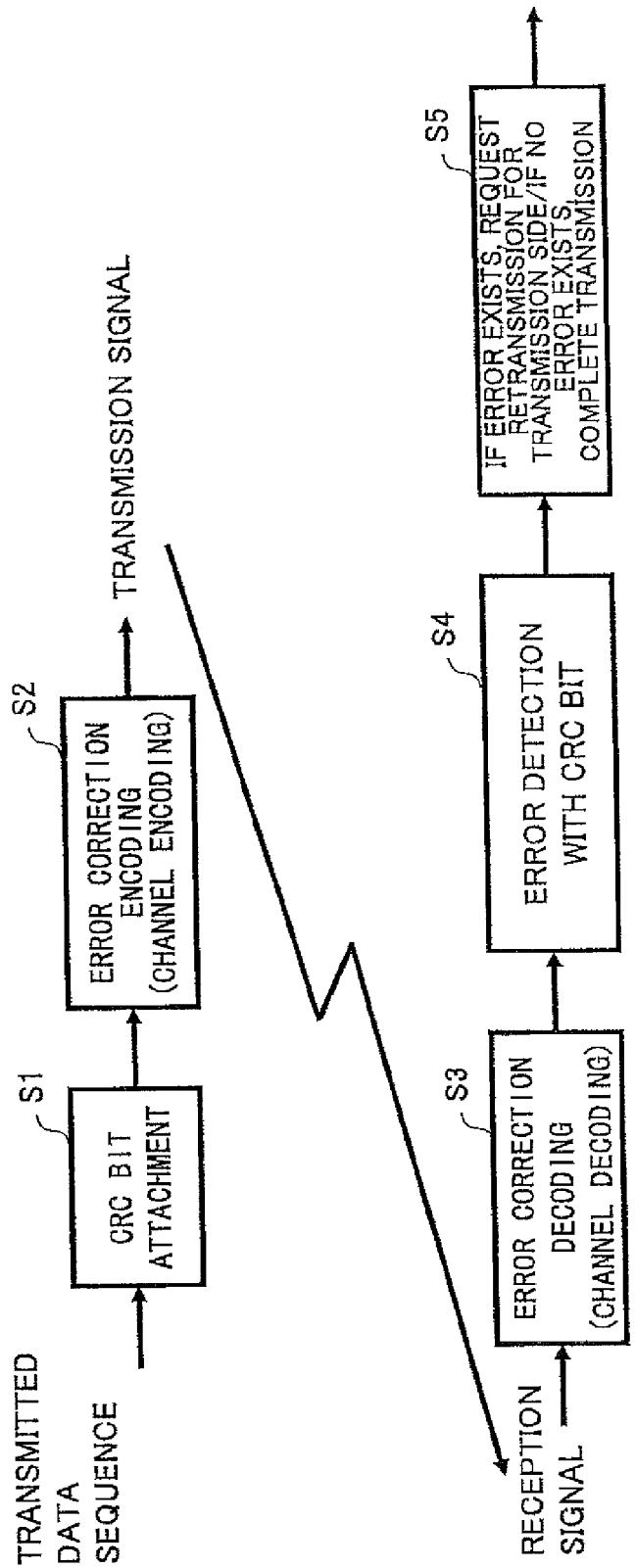
FIG. 3 is a schematic view for explaining the hybrid ARQ scheme.
Figure 4:
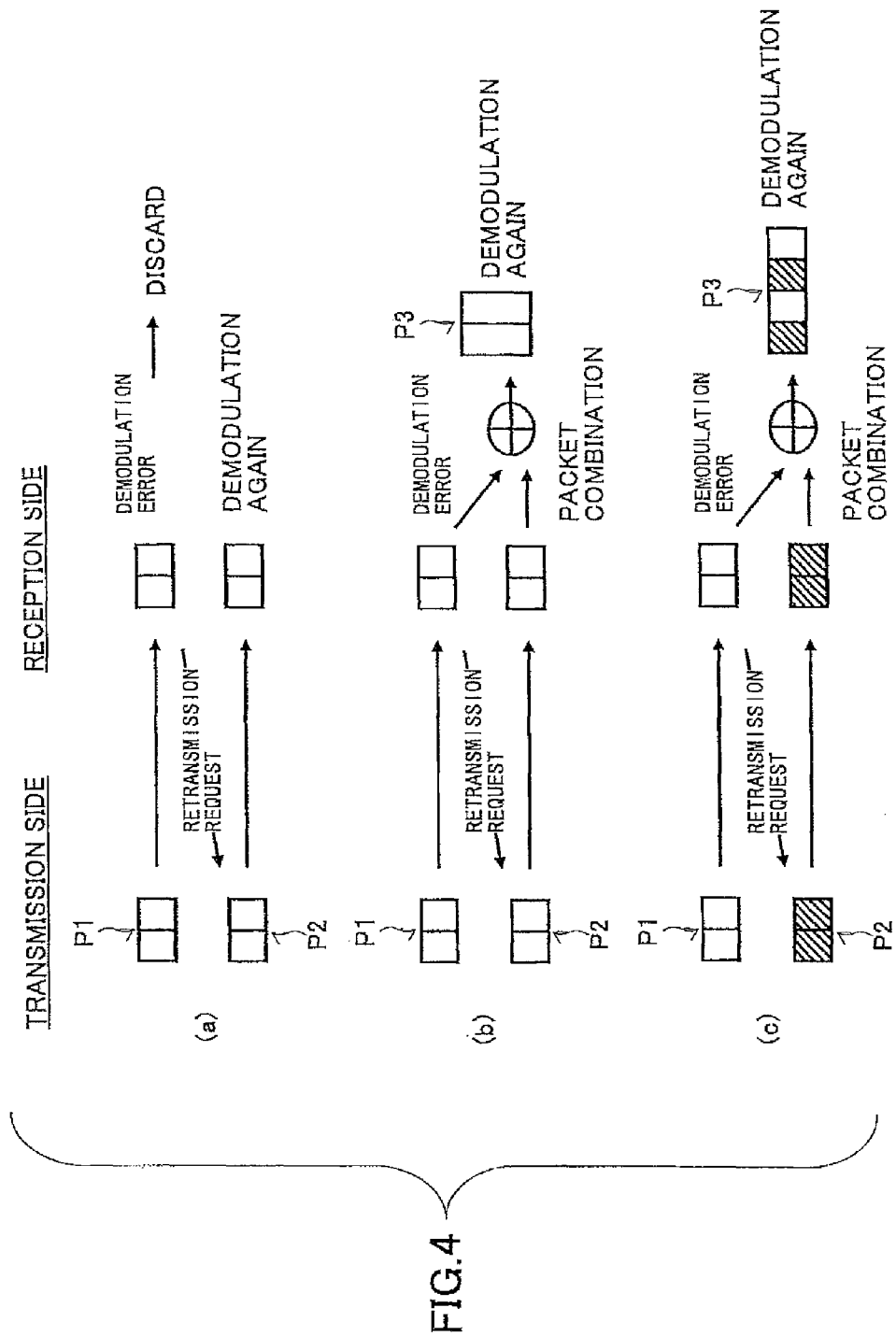
FIG. 4 is a diagram illustrating an example of retransmission schemes.
Figure 5:
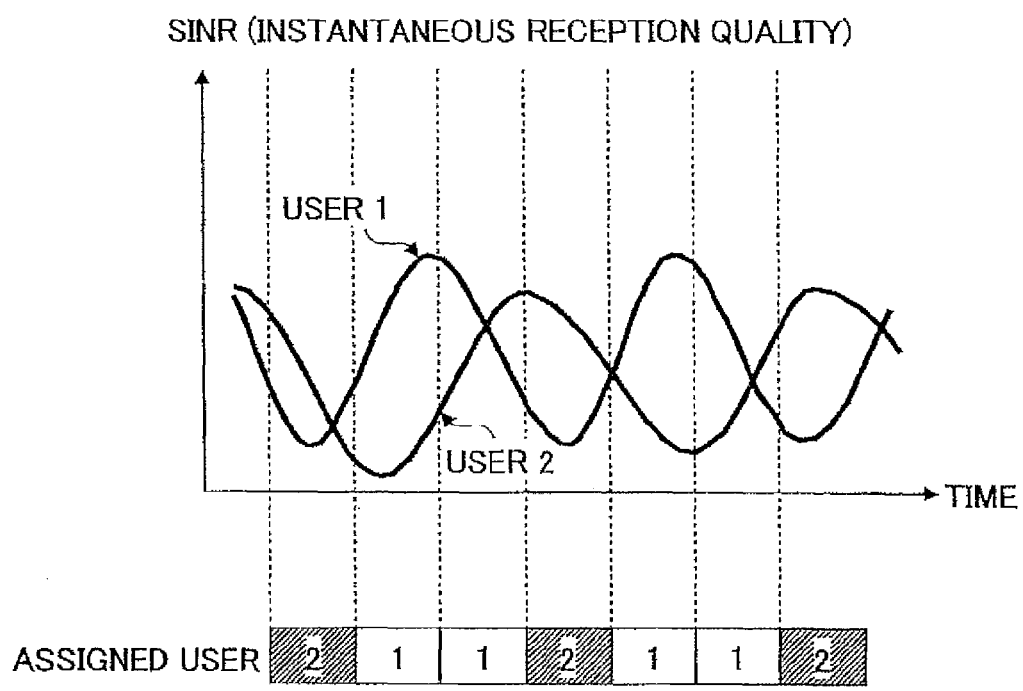
FIG. 5 is a diagram illustrating quality receiving varying over time.

10: base station
11, 12: terminal
100: transmitting station
100-1: RF receipt circuit
100-2: demodulation and decoding unit
100-3: scheduler
100-4: header information acquisition unit
100-5: packet selection unit
100-6: buffer management unit
100-7: PDC generation unit
100-8: transmission buffer
100-9: selector
100-10: encoding and modulation unit
100-11: RF transmission circuit
200: receiving station
200-1: RF receipt circuit
200-2: subcarrier signal separation unit
200-3: channel estimation unit
200-4: receiving channel state evaluation unit
200-5: feedback data generation unit
200-6: encoding and modulation unit
200-7: RF transmission circuit
200-8: demodulation unit
200-9: decoding unit
200-10: parallel to serial conversion unit
200-11: IP packet recovery unit
902: receiving channel state comparison unit
903: reported content determination part
906: control signal generation unit

BEST MODE FOR CARRYING OUT THE INVENTION

According to one implementation of the present invention, in a communication system where the frequency band of the downlink includes a plurality of frequency blocks including one or more carrier frequencies and one and more frequency blocks are used for data transmission to a single user, the quality of a received signal is evaluated for each frequency block, and the quality evaluations are compared. Then, a predetermined number of quality evaluations of the received signal are sent over a control channel on the uplink. Thus, since only the predetermined number of quality evaluations of the received signal less than the total number of frequency blocks are reported, it is possible to provide feedback on the channel state with a lesser amount of data transmission efficiently.

The predetermined number of quality evaluations of a received signal may be obtained through selection of a predetermined number of top ones among a plurality of stored quality evaluations of the received signal. The predetermined number of quality evaluations of a received signal may be quality evaluations of a received signal for one or more frequency blocks reported over a control channel on the downlink.

One or more of the predetermined number of received signal quality evaluations may be represented as differences between a reference value and them. Since the differences can be represented in a number of bits smaller than the reference value, it is possible to reduce the number of bits for use in the control channel. The reference value may be an average of received signal quality evaluations throughout the frequency band in the downlink. Also, only differences above a threshold may be provided as feedback. Consequently, it is possible to reduce the number of received signal quality evaluations to be reported.

Received signal quality evaluations transmitted over the uplink control channel may be sent in chronological order and in the form of the difference between a current evaluation and the previously transmitted evaluation. Since the difference tends to be a smaller value, it is possible to further reduce the number of bits for use in the control channel.

The transmission repetition of the predetermined number of received signal quality evaluations over the uplink control channel may be adjusted depending on Doppler frequency derived from the received signal, delay spreads and other amounts indicative of the communication state.

[First Embodiment]

In the following embodiment, the case where the OFDM (Orthogonal Frequency Division Multiplexing) scheme is adopted in the downlink is described. However, other schemes may be adopted. A broad frequency band in the downlink is divided into a plurality of frequency blocks. In general, although a single frequency block includes one or more carrier frequencies, according to this embodiment, it is supposed that each frequency block includes a plurality of subcarriers. Note that such a frequency block may be referred to as a "chunk".

Figure 6:
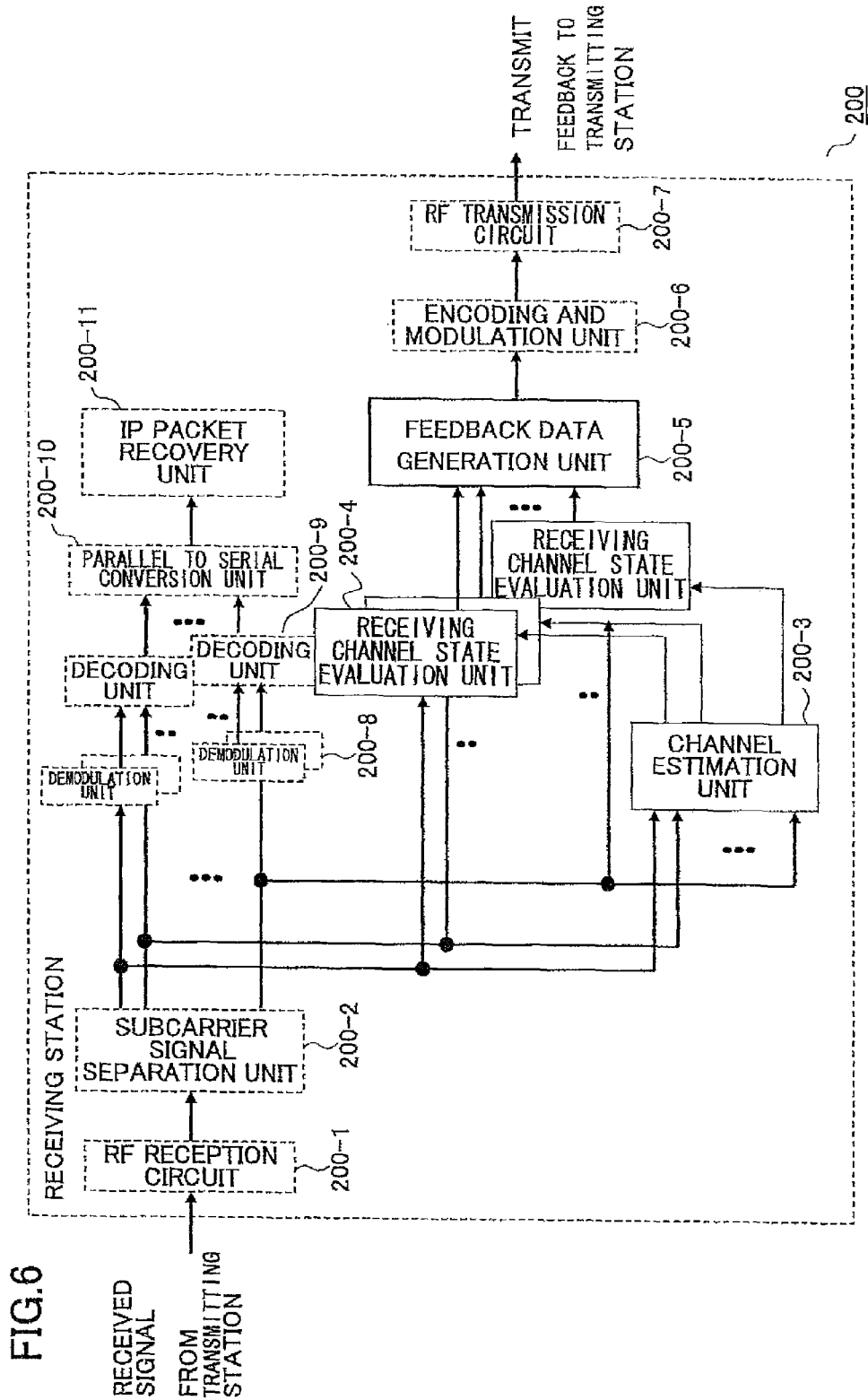
FIG. 6 is a diagram illustrating an exemplary receiving station in a mobile communication system according to one embodiment.

FIG. 6 illustrates a receiving station 200 in a mobile communication system according to one embodiment of the present invention. Although such a receiving station is typically provided in a mobile terminal, it may be provided in some apparatus other than mobile terminals. The receiving station 200 includes an RF receipt circuit 200-1, a subcarrier signal separation unit 200-2 coupled with the RF receipt circuit 200-1, a channel estimation unit 200-3 coupled with the subcarrier signal separation unit 200-2, one or more receiving channel state evaluation units 200-4 coupled with the subcarrier signal separation unit 200-2 and the channel estimation unit 200-3, a feedback data generation unit 200-5 coupled with the one or more receiving channel state evaluation units 200-4, an encoding and modulation unit 200-6 coupled with the feedback data generation unit 200-5, an RF transmission circuit 200-7 coupled with the encoding and modulation unit 200-6, one or more demodulation units 200-8 coupled with the subcarrier signal separation unit 200-2, one or more decoding units 200-9 coupled with the respective one or more demodulation units 200-8, a parallel to serial conversion unit 200-10 coupled with the one or more decoding units 200-9, and an IP packet recovery unit 200-11 coupled with the parallel to serial conversion unit 200-10.

In FIG. 6, a transmitted signal transmitted from a transmitting station (not illustrated) is received at the RF receipt circuit 200-1. The RF receipt circuit 200-1 supplies the received signal to the subcarrier signal separation unit 200-2. The subcarrier signal separation unit 200-2 divides the received signal into signals per subcarrier, and supplies the respective signals to the demodulation units 200-8, the receiving channel state evaluation unit 200-4 and the channel estimation unit 200-3.

Each demodulation unit 200-8 demodulates the supplied signals per subcarrier, and supplies the demodulated signals to the respective decoding units 200-9. The number of decoders is variable depending on the decoding algorithm in use (the coding unit used in the algorithm). Each decoding unit 200-9 decodes the supplied respective signal, and supplies the decoded signal to the parallel to serial conversion unit 200-10. The parallel to serial conversion unit 200-10 parallel-to-serial converts the incoming signal, and supplies the resulting signal to the IP packet recovery unit 200-11. The IP packet recovery unit. 200-11 recovers the incoming signal.

The channel estimation unit 200-3 uses a pilot symbol (pilot channel) for each subcarrier to perform channel estimation, and supplies such a channel estimation value to one or more receiving channel state evaluation units 200-4 for each subcarrier.

Each receiving channel state evaluation unit 200-4 evaluates the receiving channel state (ex. SIR) based on the channel estimation and the received signal for each subcarrier, and supplies the evaluation to the feedback data generation unit 200-5. The feedback data generation unit 200-5 generates feedback data (control information) indicative of the receiving channel state of the frequency block based on the evaluation of the incoming receiving channel state, and supplies it to the encoding and demodulation unit 200-6. The SIR included in the feedback data may be SIR per subcarrier just as it is, or may be some converted value such as an average of SIRs throughout a predetermined number of subcarriers included in a frequency block. The latter is why the SIR per frequency block is required in the transmitting side rather than the SIR per subcarrier. The encoding and modulation unit 200-6 encodes and modulates the incoming feedback data, and supplies the resulting signal to the RF transmission circuit 200-7. The RF transmission circuit 200-7 returns the feedback data as control information to the transmitting station 100.

Figure 7:
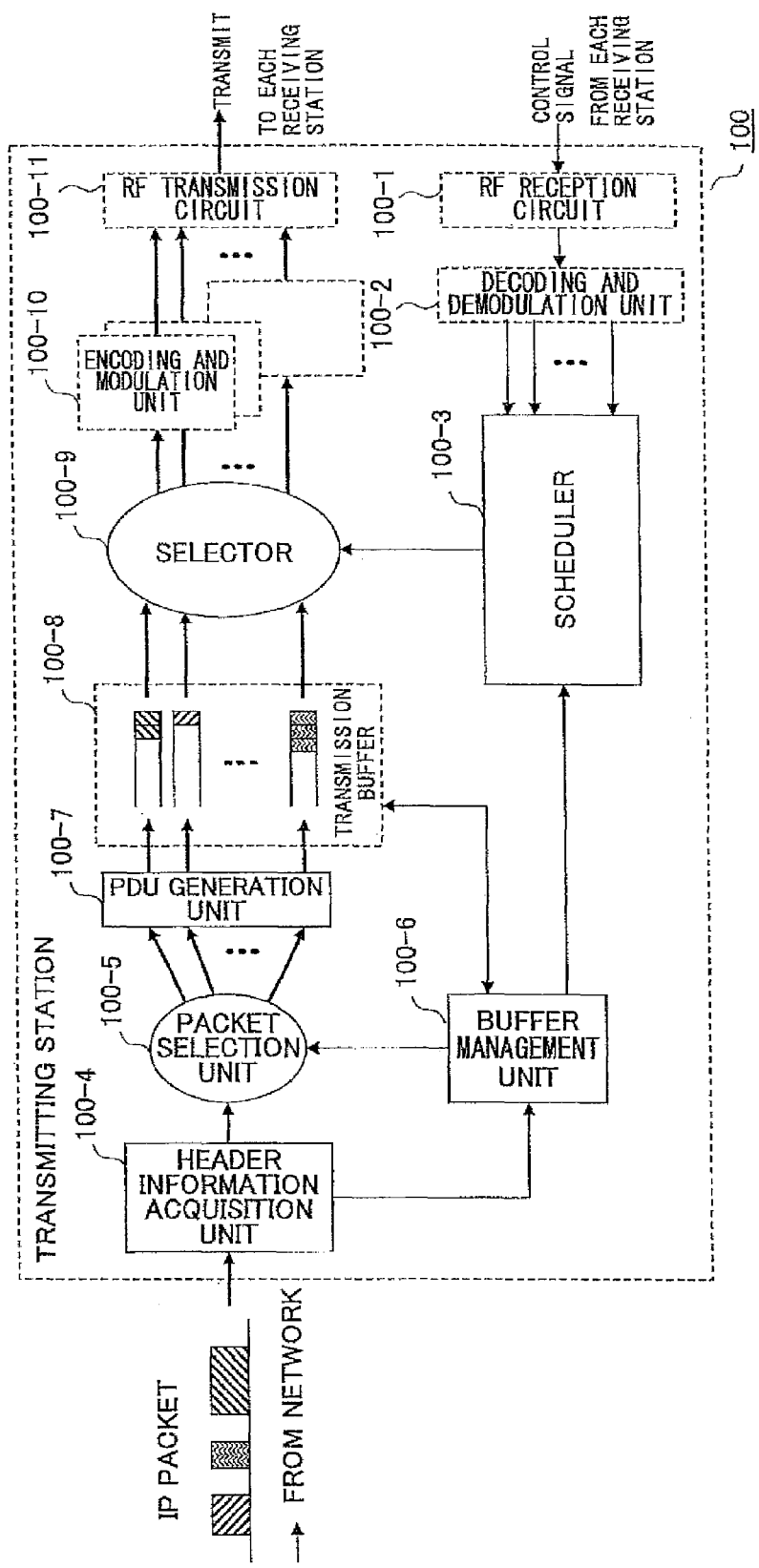
FIG. 7 is a diagram illustrating a transmitting station in a mobile communication system according to one embodiment.

FIG. 7 illustrates a transmitting station 100 in a mobile communication system according to one embodiment of the present invention. The transmitting station 100 is typically provided in a base station. However, the transmitting station 100 may be provided in other apparatuses other than base stations. The transmitting station 100 includes an RF receipt circuit 100-1, a demodulation and decoding unit 100-2 coupled with the RF receipt circuit 100-1, a scheduler 100-3 coupled with the demodulation and decoding unit 100-2, a header information acquisition unit 100-4, a packet selection unit 100-5 coupled with the header information acquisition unit 100-4, a buffer management unit 100-6 coupled with the header information acquisition unit 100-4, the packet selection unit 100-5 and the scheduler 100-3, a PDU (Protocol Data Unit) generation unit 100-7 coupled with the packet selection unit 100-5, a transmission buffer 100-8 coupled with the PDU generation unit 100-7 and the buffer management unit 100-6, a selector 100-9 coupled with the transmission buffer 100-8 and the scheduler 100-3, one or more encoding and modulation units 100-10 coupled with the selector 100-9, and an RF transmission circuit 100-11 coupled with the encoding and modulation units 100-10.

As illustrated in the lower-right portion of FIG. 7, a control signal including control information from each receiving station 200 (FIG. 6) is received at the RF receipt circuit 100-1, and the received control signal is supplied to the demodulation and decoding unit 100-2. In the demodulation and decoding unit 100-2, some demodulation and decoding operations are performed on the control signal, and upstream control information of each receiving station (including channel state in the downlink for each frequency block) is reported to the scheduler 100-3.

On the other hand, as illustrated in the upper-left portion of FIG. 7, upon receipt of an IP packet from a network, the header information acquisition unit 100-4 obtains packet header information such as a destination address from the received IF packet, reports the obtained packet header information to the buffer management unit 100-6, and supplies the IP packet to the packet selection unit 100-5.

The buffer management unit 100-6 specifies a storage location of the packet data to the packet selection unit 100-5 based on the reported packet header information and the state of each queue reported from the transmission buffer 100-8. The buffer management unit 100-6 supplies the destination address and the memory address of a queue corresponding to the destination address to the transmission buffer 100-8. The buffer management unit 100-6 informs the scheduler 100-3 of the packet header information and the state of each queue reported from the transmission buffer 100-8.

The packet selection unit 100-5 selects the incoming IP packet based on the storage location for the packet data specified by the buffer management unit 100-6, and supplies selected packets individually to the PDU generation unit 100-7. The PDU generation unit 100-7 converts the incoming packets into PDUs, and supplies the resulting PDUs to the transmission buffer 100-8.

The transmission buffer 100-8 configures a distinct queue for each destination address (each receiving station or each user) supplied from the incoming PDUs based on the destination address supplied from the buffer management unit 100-6 and the memory address of the corresponding queue, and informs the buffer management unit 100-6 of the state of each queue.

The selector 100-9 extracts data from the queue specified by the scheduler 100-3, and supplies it to the encoding and modulation unit 100-10 associated with the specified frequency block. This frequency block is assigned by the scheduler 100-3. The scheduler 100-3 determines to which user the frequency block should be assigned by priority based on the upstream control information (the channel state per frequency block in the downlink) reported from each receiving station, the packet header information and the state of each queue.

The encoding and modulation unit 100-10 performs encoding and modulation on the data supplied from the selector 100-9. The encoded and modulated data are sent to each receiving station by the RF transmission circuit 100-11.

Based on the control information returned from the receiving station 200 as feedback, the scheduler 100-3 generates a ranking table where each user is ranked in accordance with the associated priority. The priority is derived for each frequency block based on the quality of the receiving channel state of each user. Then, scheduling is performed for each frequency block. For example, as illustrated in FIG. 8, the downlink frequency band is divided into three frequency blocks 1, 2 and 3. These three frequency blocks are included in any of radio frames (time slots) For each frame and each frequency block, a user with the best receiving channel state is selected, and then for the selected user, the shared data packet in the downlink is assigned to the frequency block in the frame. In the illustrated example, for the second radio frame from the left, the frequency block 1 is assigned to the user #2, the frequency block 2 is assigned to the user #1, and the frequency block 3 is assigned to the user #4. For the immediately successive radio frame, the frequency blocks 1 and 2 are assigned to the user #2, and the frequency block 3 is assigned to the user #3.

On the other hand, in the case where frequency is scheduled in favor of a user with a good receiving channel state, there is a likelihood that more frequency blocks are assigned to some users whereas less frequency blocks are assigned to the other users. In order to maintain fair assignment among users, the number of frequency blocks assigned to a single user within one radio frame may be limited to be less than or equal to a predetermined value K (K is a certain natural number). In other words, a user to which K frequency blocks are assigned may be deleted from the ranking table for unassigned frequency blocks, and then the unassigned frequency blocks may be assigned to other users.

The priority for the frequency blocks may be determined based on the illustratively listed criteria as presented below.

(1) Receiving channel state of each frequency block (2) Ratio between time average of the receiving channel states in each frequency block and the receiving channel state for each frequency block in the radio frame (3) Ratio between average the receiving channel state over all subcarriers (included in the frequency block) and the receiving channel state of the target frequency block in the radio frame (4) Ratio between time average over averages of the receiving channel state over all subcarriers (included in the frequency block) and the receiving channel state of the target frequency block in the radio frame In case of the same priority based on the receiving channel state such as a reception SIR, the frequency block is assigned in favor of a user with a greater delay spread, and thereby the peak throughput is improved due to the frequency diversity effect. Alternatively, in case of the same priority based on the receiving channel state such as a reception SIR, the frequency block may be assigned to a user with a smaller delay spread by priority. For a user with a greater delay spread, another frequency block can be assigned to the user because of a small difference of the average receiving channel states between frequency blocks such as difference between the average reception SIRS.

[Second Embodiment]

As described in the first embodiment, improved frequency utilization efficiency is achieved by dividing the downlink frequency band into a plurality of frequency blocks and assigning one or more frequency blocks to a user with a better channel state by priority. In this case, the receiving channel state of each frequency block must be known to perform frequency scheduling. The receiving channel state may be SIR measured at a receiving station (typically a mobile terminal), for example, and may be reported to a transmitting station (typically a base station) over an uplink control channel transmitted from the receiving station. The transmitting station must know the receiving channel state not only for each user but also for each frequency block. As a result, it is a concern that there is a significant increase in the information transmission amount in the control channel for preparing and scheduling a plurality of frequency blocks.

In general, the information amount $R_{up}$ (bit rate) required in an uplink control channel can be represented in the formula as follows;

$$R_{up}=(K_s+A\times N\times K_a)/T \qquad (1)$$

where $K_s$ represents the number of users to which frequency blocks are actually assigned, A represents the number of bits required to represent SIR (in this embodiment, A=5), N represents the total number of frequency blocks, $K_a$ represents the number of users to which frequency blocks may be possibly assigned, and T represents the duration of a single packet, which may be referred to as TTI (Transmission Time Interval). One bit is reserved to report the CRC result (ACK/NACK) of hybrid ARQ. In the above formula, the term "$K_s/T$" represents the information amount associated the CRC result from each user to which frequency blocks are actually assigned, and does not depend on the number N of frequency blocks. The term "$(A\times N\times K_a)/T$" represents the information amount required to report SIR per frequency block to each user.

For example, assuming that $K_s=4$, N=8, $K_a=20$ and T=0.5 ms, it holds that $R_{up}=1.61$ Mbps.

Alternatively, assuming that $K_s=8$, N=8, $K_a=40$ and T=0.5 ms, it holds that $R_{up}=3.22$ Mbps.

In this way, the greater the number of frequency blocks is, the significantly more is the information amount transmitted in the control channel. The second embodiment of the present invention is intended to overcome the above-mentioned problem. According to this embodiment, in a communication system where the downlink frequency band is divided into a plurality of frequency blocks and one or more frequency blocks are used for a user with a better receiving channel state by priority, it is possible to provide a radio communication apparatus and method capable of efficiently reporting the channel state with less data transmission amount in the uplink control channel.

Figure 9:
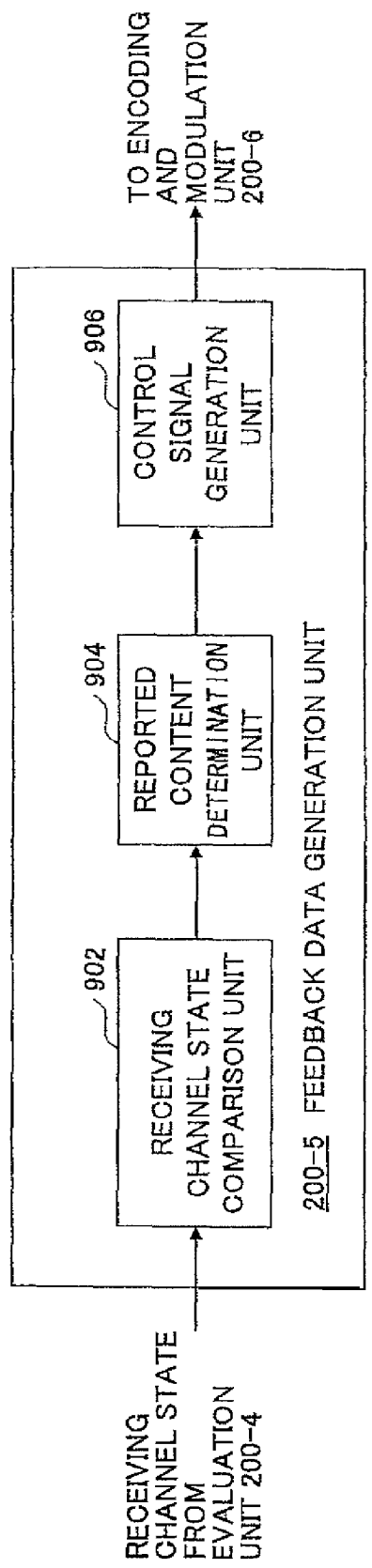
FIG. 9 shows an exemplary feedback data generation unit for use in one embodiment.

FIG. 9 illustrates a feedback data generation unit for use in this embodiment. This feedback data generation unit may be used as a feedback data generation unit 200-5 of FIG. 6. The feedback data generation unit 200-5 includes a receiving channel state comparison unit 902, a reported content determination part 904 and a control signal generation unit 906.

The receiving channel state comparison unit 902 receives an amount indicative of received channel state, which is SIR in this embodiment, from the receiving channel state evaluation unit 200-4. In case where the received SIR does not correspond to SIR per frequency block, an averaging operation or another suitable operation may be carried out. For example, suppose that SIR is measured for each 1000 subcarriers and a single frequency block includes 100 subcarriers. In this case, every 10 SIRs out of 100 SIRs obtained for each 100 subcarriers are averaged so that 10 SIRs associated with 10 frequency blocks can be derived. The SIRs per subcarrier and/or frequency block are stored in an appropriate memory. The receiving channel state comparison unit 902 compares the SIRs per frequency block with each other, and provides a comparison result.

The reported content determination part 904 selects SIRs associated with a predetermined number of frequency blocks, and determines which SIR should be reported to abase station. Such a predetermined number of frequency blocks may be determined as follows.

Figure 10:
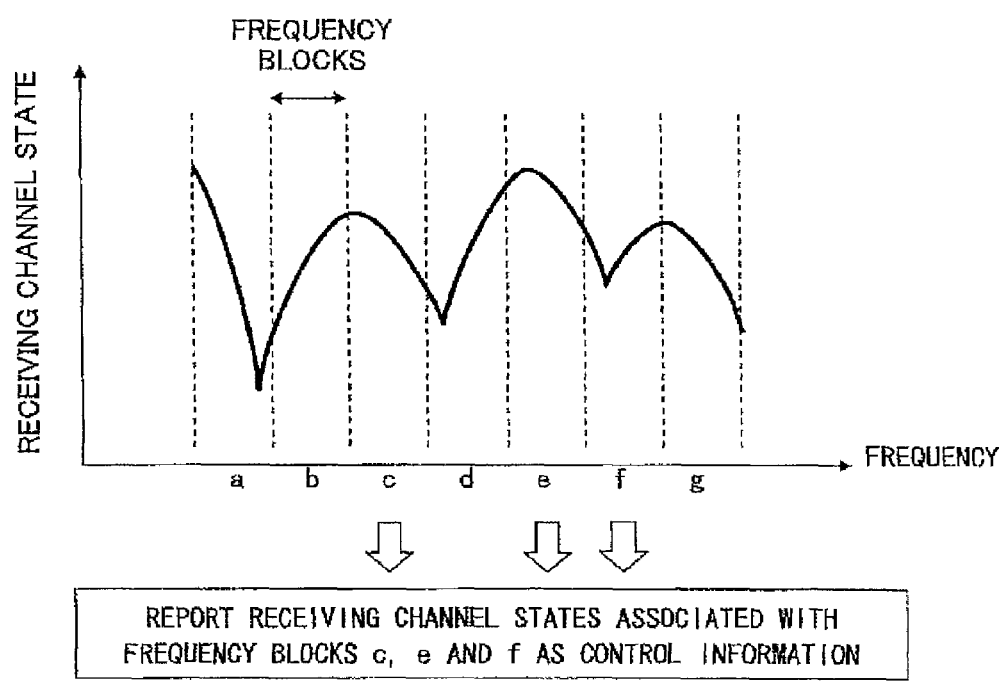
FIG. 10 is a diagram for explaining an exemplary operation according to one embodiment of the present invention.

(1) Among a plurality of SIRs stored in the memory, the top L SIRS indicative of better quality may be selected. For example, suppose that if SIR as illustrated in FIG. 10 is obtained the top three SIRs (L=3) are selected. In this case, the three SIRs associated with the frequency blocks "c", "e" and "f" are selected among the frequency blocks "a", "b", "c", "d", "e", "f" and "g". It may be determined in advance how many of the top SIRs should be reported. Also, the number may be changed depending on instruction from a base station.

Figure 11:
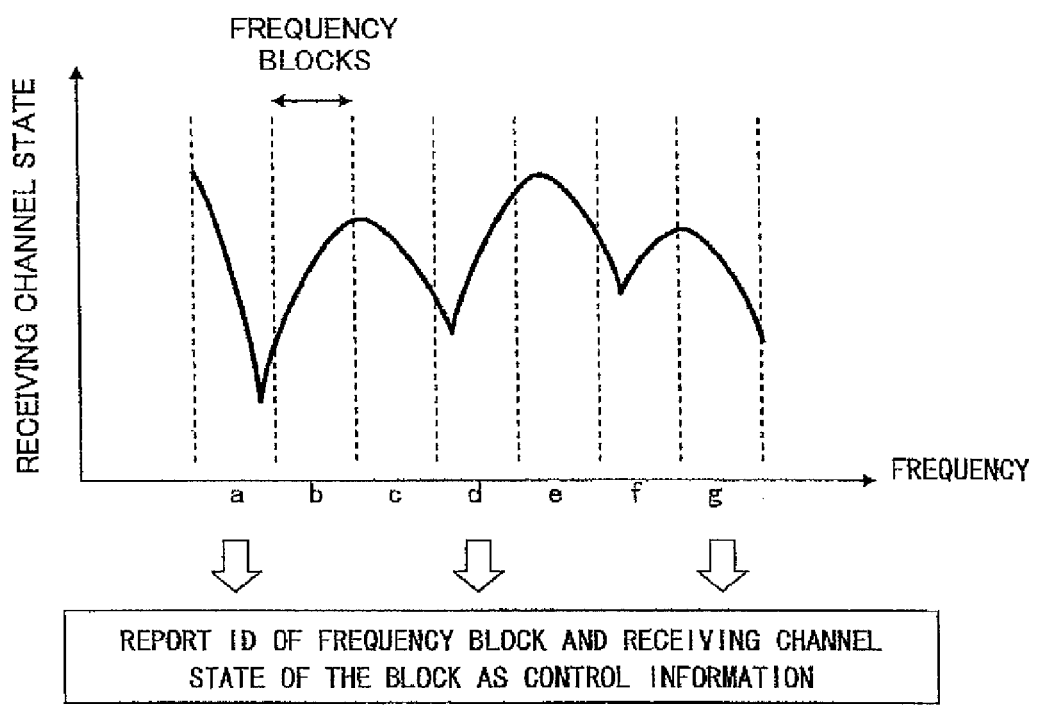
FIG. 11 is a diagram for explaining another exemplary operation according to one embodiment of the present invention.

(2) Among a plurality of SIRS stored in the memory, SIRs associated with X frequency blocks specified from a base station may be selected. For example, SIR (receiving channel state) as illustrated in FIG. 10 is measured at a radio station, and assuming that downlink data toward the mobile station are transmitted in the frequency blocks "c" and "d". In this case, the base station may instruct the mobile station to report the two SIR associated with the frequency blocks "c" and "d", or may instruct the mobile station to report SIRs associated with other frequency blocks in addition to or instead of those of the frequency blocks "c" and "d". For example, SIRS associated with frequency blocks selected for every two frequency blocks may be reported among a plurality of frequency blocks located on the frequency axis. For example, if SIR as illustrated in FIG. 11 is measured, the three SIRs associated with the frequency blocks "a", "d" and "g" may be selected.

(3) Among a plurality of SIRS stored in the memory, one or more SIRs above a predefined threshold may be selected. In other words, only SIRs associated with frequency blocks with relatively better channel states may be reported to a base station among the stored SIRS.

The control signal generation unit 906 of FIG. 9 generates a control signal including identification information (ID) of a frequency block selected in the report content determination unit 904 and SIR associated with the frequency block. In other words, the control signal includes a predetermined number of combinations of the IDs of and SIRs associated with the frequency blocks. Also, if any frequency block has been already assigned and downlink data have been received, the control signal also includes information indicative of an error detection result of that data. As stated above, the error detection result information may be represented in one bit to indicate affirmative acknowledge (ACK) or negative acknowledge (NACK). The control signal generated in this manner is provided to the encoding and modulation unit 200-6, where some appropriate operation is subsequently performed, and the feedback is provided to the base station.

According to this embodiment, the SIRs to be reported to a base station are selected based on certain criteria, resulting in a decrease in the number of SIRs (the number of frequency blocks) to be reported. Thereby, it is possible to reduce the amount of information transmitted on the uplink control channel while maintaining information necessary to determine frequency blocks with better channel states for each user.

[Third Embodiment]

Figures 12, 13:
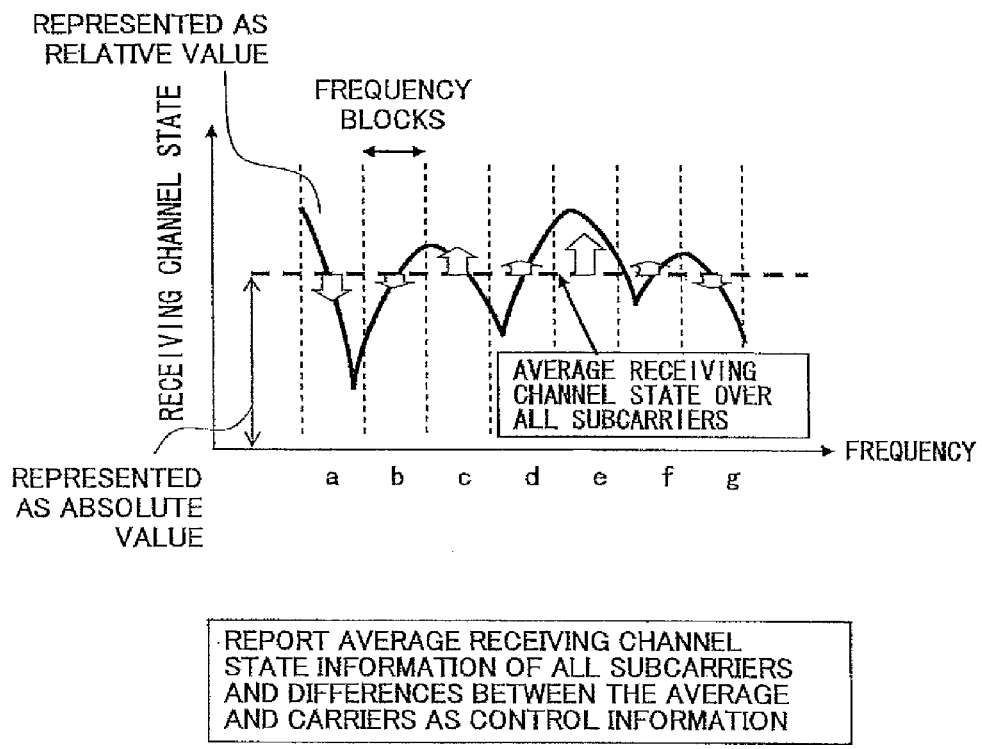
FIG. 12 is a diagram for explaining another exemplary operation according to one embodiment of the present invention.
FIG. 13 is a diagram illustrating an exemplary comparison of amounts of data transmission.

In the second embodiment, the number of SIRs (the number of frequency blocks) to be reported to a base station is reduced, but the number of bits to represent SIRs may be reduced. For example, the absolute value of a SIR associated with a certain frequency block may be represented in five bits, and SIRs associated with the other frequency blocks may be represented in form of differences (relative values) between the SIRs and the absolute value. In general, since the difference can be represented in a number of bits smaller than five bits, the transmission amount can be reduced compared to the case of where all SIRs are represented in five bits. The SIR represented as the absolute value may be associated with an arbitrary frequency block. For example, the frequency block including the lowest carrier frequency or the frequency block including the highest carrier frequency may be represented in the form of the absolute value. Alternatively, instead of SIR associated with a frequency block, a predefined different value may be prepared, and each SIR may be represented in the form of the difference between the SIR and the predefined value. As illustrated in FIG. 12, the average of SIRs aver the entire band may be represented in the form of the absolute value, and the SIR associated with each frequency block maybe represented in the form of the difference between the SIR and the average.

Alternatively, SIR at a certain time point may be represented in the form of the absolute value, and subsequent SIRs may be represented as a temporal variations to the absolute value. Further, SIR at the current time point may be represented as temporal variation to SIR at the immediately previous time point. In general, since the amount of short term variation is smaller than that of long term variation, SIR can be represented with a reduced transmission amount in this manner. However, if an error is detected in a signal received at a mobile station, it is desirable to prevent a chain of inaccurate values by reporting the absolute value and/or ignoring the temporal variation to the immediately previous SIR at the next time.

According to this embodiment, SIR to be reported to a base station is represented as some value (relative value) such as the absolute value and/or difference. The reduction in the number of bits required to report SIR makes it possible to reduce the information amount transmitted in the uplink control channel while maintaining information necessary to determine a frequency block with a better channel state for each user.

[Fourth Embodiment]

In the second and the third embodiments, the data transmission amount required to provide a single feedback is reduced. On the other hand, the feedback may be infrequently provided. For example, the frequency of the feedback may be adjusted based on mobility of a receiving station. Since it is estimated that reception environment of a slow moving receiving station varies less, the frequency of feedback may be decreased. The mobility can be evaluated, for example, based on the maximum Doppler frequency, and the maximum Doppler frequency is small in case of slow movement. On the other hand, since it is estimated that the reception environment of a fast moving receiving station varies relatively more, the frequency of feedback may be increased. In general, since a receiving station more frequently moves at slow speed than fast speed, it is estimated that frequent feedback does not have to be supplied.

In addition, the content or the frequency of feedback may be adjusted depending on the delay spread in the downlink. In general, the smaller the delay spread is, the smaller is the channel variation in the frequency range. Thus, since the difference of SIRs between frequency blocks is small for a user with an observed small delay spread, the channel state may be evaluated based on the single average of SIRs over the entire band. Alternatively, the frequency of feedback may be decreased.

In addition, only in the case where the level of SIR significantly varies compared to a previously reported SIR (only in the case where the variation amount exceeds a threshold) is the SIR sent to a base station. For example, if the temporal variation of SIR is small, such as in case of a stationary state, the reporting frequency of feedback can be reduced.

According to this embodiment, the reduction in the reporting frequency of SIRS makes it possible to decrease the information amount transmitted in the uplink control channel while maintaining information necessary to determine frequency blocks with a better channel state for each user.

The schemes described in the different embodiments may be employed by themselves or in any combination thereof.

FIG. 13 illustrates an exemplary comparison of data transmission amounts for use in the different embodiments. As stated above, the required information amount $R_{up}$ bit rate) in an uplink control channel according to the first embodiment can be represented as follows;

$$R_{up}=(K_s+A\times N\times K_s)/T \quad (1),$$

where $K_s$ represents the number of users to which frequency blocks are actually assigned, A represents the number of bits required to represent SIR (in this embodiment, A=5), N represents the total number of frequency blocks, $K_a$ represents the number of users to which frequency blocks may be assigned, and T represent the transmission time interval TTI.

According to the second embodiment, SIRs associated with N' frequency blocks less than the total number N of frequency blocks are reported to abase station. Thus, the required information amount $R_{up}$ in an uplink control channel can be represented as follows;

$$R_{up}=(K_s+A\times N'\times K_a)/T \quad (2).$$

According to the third embodiment, SIRS are represented by an absolute value and values relative to the absolute value. Thus, the required information amount $R_{up}$ in an uplink control channel can be represented as follows;

$$R_{up}=(K_s+(A\times 1+Y\times(N-1))\times K_a)/T \quad (3).$$

In this formula, the term "A×1" represents the number of bits required to represent a single absolute value, and Y represents the number of bits required to represent a relative value (difference) from the absolute value. Among N frequency blocks, SIR associated with a. single frequency block is represented in the form of the absolute value, and SIRs associated with the remaining (N−1) frequency blocks are represented in the form of relative values.

In case where the second embodiment scheme is combined with the third embodiment scheme, SIRs are represented as the absolute value and relative values, and only SIRs associated with N' frequency blocks are reported to a base station. Thus, the required information amount $R_{up}$ in an uplink control channel can SO be represented as follows;

$$R_{up}=(K_s+(A\times 1+Y\times(N'-1))\times K_a)/T \quad (4).$$

FIG. 13 illustrates exemplary values of the information amount $R_{up}$ computed in accordance with the formulae (1)-(4) in the case of the following parameter setting:

$K_a$ (the number of users to which frequency blocks may be assigned)=20 or 40;

$K_s$ (the number of users to which frequency blocks are actually assigned)=4;

N (the total number of frequency blocks)=8;

N' (the number of frequency blocks associated with SIRs to be reported to a base station)=4;

A (the number of bits used to represent the absolute value)=5;

Y (the number of bits used to represent differences the absolute value)=2; and

T (transmission time interval TTI)=0.5 ms.

In this illustration, the values in the column "1$^{st}$ EMBODIMENT" are computed in accordance with the formula (1), the values in the column "2$^{nd}$ EMBODIMENT" are computed in accordance with the formula (2), the values in the column "3$^{rd}$ EMBODIMENT" are computed in accordance with the formula (3), and the values in the column "2$^{nd}$+3$^{rd}$ EMBODIMENTS" are computed in accordance with the formula (4). According to the present invention, it is possible to reduce the information amount significantly even in cases of 20 and 40 users. Compared to the first embodiment, the information amount can be reduced to 51%, 48% and 28% according to the second embodiment, the third embodiment and the second and the third embodiments, respectively.

In the above description, some preferred embodiments of the present invention have been described. However, the present invention cannot be limited to the exact embodiments but variations and modifications can be made within the sprit of the present invention. For convenience, the present invention has been described through some separate embodiments, but the separation between the embodiments is not essential to the present invention, and one or more embodiments may be used it needed.

This international patent application is based on Japanese Priority Application No. 2005-106907 filed on Apr. 1, 2005, the entire contents of which are hereby incorporated by reference.

The invention claimed is:

1. A radio communication apparatus for use in a communication system where a downlink frequency band includes a plurality of frequency blocks including one or more carrier frequencies and one or more of the frequency blocks are used for data transmission to a single user, the radio communication apparatus comprising:
a transmission unit configured to transmit a signal to a communication opponent; and
a reception unit configured to receive an uplink control signal including CQIs and a detected ACK or NACK from a communication opponent,
wherein if the transmitted signal includes data, the detected ACK or NACK included in the uplink control signal received at the reception unit is detected, and the CQIs included in the uplink control signal received at the reception unit are determined as a reference value calculated from a plurality of measurement results over the overall downlink frequency band, and
wherein the plurality of measurement results for a predetermined number of frequency blocks are selected from reception signal qualities measured for a plurality of frequency blocks included in the downlink frequency band at a predetermined time instant and difference values between the selected measurement results and the reference value.

2. The radio communication apparatus as claimed in claim 1, wherein the predetermined number of measurement results having higher reception signal qualities among the measurement results are selected as the CQIs included in the received uplink control signal, and an average CQI is determined based on the selected measurement results.

3. The radio communication apparatus as claimed in claim 1, wherein the measurement results are selected as the CQIs included in the received uplink control signal based on an indication, and an average CQI is determined based on the selected measurement results.

4. The radio communication apparatus as claimed in claim 1, wherein in the CQIs included in the uplink control signal received at the reception unit, the measurement results are averaged in determining the CQIs.

5. A radio communication method for use in a communication system where a downlink frequency band includes a plurality of frequency blocks including one or more carrier frequencies and one or more of the frequency blocks are used for data transmission to a single user, the radio communication method comprising:
transmitting a signal to a communication opponent; and
receiving an uplink control signal including CQIs and a detected ACK or NACK from a communication opponent,
wherein if the transmitted signal includes data, the detected ACK or NACK included in the received uplink control signal is detected, and the CQIs included in the received uplink control signal are determined as a reference value calculated from a plurality of measurement results over the overall downlink frequency band, and
wherein the plurality of measurement results for a predetermined number of frequency blocks are selected from reception signal qualities measure for a plurality of frequency blocks included in the downlink frequency band at a predetermined time instant and difference values between the selected measurement results and the reference value.

6. The radio communication method as claimed in claim 5, wherein the predetermined number of measurement results having higher reception signal qualities among the measurement results are selected as the CQIs included in the received uplink control signal, and an average CQI is determined based on the selected measurement results.

7. The radio communication apparatus method as claimed in claim 5, wherein the measurement results are selected as the CQIs included in the received uplink control signal based on an indication, and an average CQI is determined based on the selected measurement results.

8. The radio communication method as claimed in claim 5, wherein in the CQIs included in the received uplink control signal, the measurement results are averaged in determining the CQIs.

9. A communication system where a downlink frequency band includes a plurality of frequency blocks including one or more carrier frequencies and one or more of the frequency blocks are used for data transmission to a single user, the system comprising:
a base station; and
a terminal configured to receive a signal from the base station, the terminal comprising:
a reception unit configured to receive a signal from the base station;
a detection unit configured to detect, if the signal received at the reception unit includes data, an ACK or a NACK for the data;
a measurement unit configured to measure reception signal qualities for a plurality of frequency blocks included in a downlink frequency band at a predetermined time instant;
a generation unit configured to determine CQIs to be transmitted as the reception signal qualities at the time instant by selecting measurement results for a predetermined number of frequency blocks from measurement results at the measurement unit; and
a transmission unit configured to transmit an uplink control signal including the CQIs determined at the generation unit to be transmitted and the ACK or the NACK detected at the detection unit,
wherein the generation unit determines a reference value calculated from a plurality of measurement results over the overall downlink frequency band and difference values between the selected measurement results and the reference value as the CQIs to be transmitted.

* * * * *